United States Patent
Yu et al.

(10) Patent No.: US 10,284,455 B2
(45) Date of Patent: May 7, 2019

(54) METHOD, TERMINAL AND SYSTEM FOR CLUSTER TERMINAL TO FEED BACK DOWNLINK CHANNEL INFORMATION

(71) Applicant: Hytera Communications Corporation Limited, Shenzhen, Guangdong (CN)

(72) Inventors: Qingxiang Yu, Guangdong (CN); Lichang Wu, Guangdong (CN); Jiping Li, Guangdong (CN)

(73) Assignee: Hytera Communications Corporation Limited, Shenzhen, Guangdong (CN)

( * ) Notice: Subject to any disclaimer, the term of this patent is extended or adjusted under 35 U.S.C. 154(b) by 0 days.

(21) Appl. No.: 15/736,587

(22) PCT Filed: Jun. 15, 2015

(86) PCT No.: PCT/CN2015/081432
§ 371 (c)(1),
(2) Date: Dec. 14, 2017

(87) PCT Pub. No.: WO2016/201594
PCT Pub. Date: Dec. 22, 2016

(65) Prior Publication Data
US 2018/0191598 A1    Jul. 5, 2018

(51) Int. Cl.
*H04L 12/26* (2006.01)
*H04L 12/24* (2006.01)
(Continued)

(52) U.S. Cl.
CPC ............. *H04L 43/16* (2013.01); *H04L 41/08* (2013.01); *H04W 24/08* (2013.01); *H04W 24/10* (2013.01);
(Continued)

(58) Field of Classification Search
CPC combination set(s) only.
See application file for complete search history.

(56) References Cited

U.S. PATENT DOCUMENTS

2010/0041430 A1* 2/2010 Ishii ................. H04L 5/0075
455/522
2015/0257151 A1* 9/2015 Lin .................... H04W 4/08
370/259
(Continued)

FOREIGN PATENT DOCUMENTS

CN    101232690 A    7/2008
CN    101431767 A    5/2009
(Continued)

OTHER PUBLICATIONS

International Search Report for International Application No. PCT/CN2015/081432 dated Mar. 16, 2016.
(Continued)

*Primary Examiner* — Hicham B Foud
(74) *Attorney, Agent, or Firm* — Wolf, Greenfield & Sacks, P.C.

(57) ABSTRACT

A method, a terminal, and a system for a cluster terminal to feedback downlink channel information are provided. In the method, a cluster terminal in an idle state configures a group call context and measures a current downlink channel in a preset period, after receiving a group call signaling sent by a base station. The cluster terminal sends an RRC connection request carrying a measurement result to the base station after determining that the measurement result meets a preset report triggering condition. The base station modifies an air interface resource configuration when determining that a preset condition for modifying the air interface resource configuration is met according to the measurement result and sends an instruction carrying the modified air interface resource configuration to the cluster terminal. The cluster terminal receives group call data according to the instruction after receiving the instruction.

19 Claims, 5 Drawing Sheets

(51) Int. Cl.
*H04W 24/08* (2009.01)
*H04W 24/10* (2009.01)
*H04W 76/10* (2018.01)
*H04W 76/27* (2018.01)
*H04W 88/08* (2009.01)

(52) U.S. Cl.
CPC ............ *H04W 76/10* (2018.02); *H04W 76/27* (2018.02); *H04W 88/08* (2013.01)

(56) References Cited

U.S. PATENT DOCUMENTS

2015/0341494 A1    11/2015  Zhou
2018/0270682 A1*  9/2018  Zacharias ............. H04W 76/10

FOREIGN PATENT DOCUMENTS

| CN | 101521902 A | 9/2009 |
|---|---|---|
| CN | 102045824 A | 5/2011 |
| CN | 102300227 A | 12/2011 |
| CN | 103052038 A | 4/2013 |
| CN | 104581951 A | 4/2015 |

OTHER PUBLICATIONS

Written Opinion for International Application No. PCT/CN2015/081432 dated Mar. 16, 2016.

* cited by examiner

METHOD, TERMINAL AND SYSTEM FOR CLUSTER TERMINAL TO FEED BACK DOWNLINK CHANNEL INFORMATION

CROSS-REFERENCE TO RELATED APPLICATIONS

The present application is the national phase of International Patent Application No. PCT/CN2015/081432 filed on Jun. 15, 2015, which is incorporated herein by reference in its entirety.

FIELD

The present disclosure relates to the technical field of network communications, and in particular to a method, a terminal and a system for a cluster terminal to feedback downlink channel information.

BACKGROUND

With a rising demand of customers for a voice and video fusion system, it is urgent to provide voice services, high-speed data services, video monitoring services, visual dispatching services, positioning services and other services to customs via the same network. The main services of a private network cluster industry include a single call service, group call service, video unicast service, video multicast service, positioning service and the like.

In the broadband cluster group call service in the conventional technology, all the users share a downlink cluster dedicated channel. Generally, only a calling user is in a radio resource control (RRC) connection state, and other users are in a RRC idle state basically. In the B-TrunC, a downlink channel feedback mechanism is designed for the cluster terminal in the RRC connection state, and the base station adjusts the scheduled resources for a group call dynamically based on a downlink channel state and the group call data receiving state of the group call user to increase the throughput of the system.

However, in the private network standard, the scheduled resources are adjusted dynamically based on the downlink channel state fed back by only the cluster terminal in the RRC connection state, because the cluster terminals in the RRC idle state cannot feedback the downlink channel state and the group call data receiving state, resulting in a low accuracy of dynamic adjustment on the scheduled group call resources based on the downlink channel state and the group call data receiving state of the group call user by the base station, and thus resulting in a low throughput and a low reliability of the system without a balance thereof.

SUMMARY

A method, a terminal and a system for a cluster terminal to feedback downlink channel information are provided in the present disclosure, which can solve the problem in the conventional technology that a base station cannot accurately adjust group call resources based on a downlink channel state and a group call data receiving state.

A method for a cluster terminal to feedback downlink channel information is provided in a first aspect of the present disclosure, which includes:

configuring, by a cluster terminal in an idle state, a group call context and measuring a current downlink channel in a preset period, after a group call signaling sent by a base station is received;

sending, by the cluster terminal, a radio resource control, RRC, connection request carrying a measurement result to the base station after determining that the measurement result meets a preset report triggering condition, so that the base station modifies an air interface resource configuration when determining that a preset condition for modifying the air interface resource configuration is met according to the measurement result, and sends an instruction carrying the modified air interface resource configuration to the cluster terminal; and receiving, by the cluster terminal, group call data according to the instruction after the instruction is received.

Based on the first aspect, in a first implementation of the first aspect of the present disclosure, the preset report triggering condition includes any one of: a neighbor channel quality being higher than a maximum threshold, the neighbor channel quality being lower than a minimum threshold, a wireless link failing, the number of group call data packets received in a preset time being less than a preset threshold, and a sequence number of received group call data being invalid.

Based on the first aspect and the first implementation way of the first aspect, in a second implementation of the first aspect of the present disclosure, the method further includes: before measuring the current downlink channel, configuring, by the cluster terminal, the preset report triggering condition.

Based on the first aspect and the first implementation of the first aspect, in a third implementation of the first aspect of the present disclosure, the method further includes: before measuring the current downlink channel, receiving, by the cluster terminal, a system message including the preset report triggering condition or a group call message including the preset report triggering condition sent by the base station.

Based on the first aspect and the first to the third implementations of the first aspect, in a fourth implementation of the first aspect of the present disclosure, the method further includes:

sending, by the cluster terminal, the RRC connection request carrying the measurement result to the base station after determining that a measurement result meets the preset report triggering condition, so that the base station returns a response of rejecting connection to the cluster terminal when determining that the preset condition for modifying the air interface resource configuration is not met according to the measurement result.

A cluster terminal is provided in a second aspect of the present disclosure, where the cluster terminal includes:

a first configuration module, configured to configure a group call context after a group call signaling sent by a base station is received;

a measurement module, configured to measure a current downlink channel in a preset period according to the group call context configured by the configuration module;

a first sending module, configured to send an RRC connection request carrying a measurement result to the base station after it is determined that the measurement result meets a preset report triggering condition, so that the base station modifies an air interface resource configuration when determining that a preset condition for modifying the air interface resource configuration is met according to the measurement result, and sends an instruction carrying the modified air interface resource configuration to the cluster terminal; and a first receiving module, configured to receive group call data according to the instruction after the instruction is received.

Based on the second aspect, in a first implementation way of the second aspect of the present disclosure, the cluster terminal further includes:

a second configuration module, configured to configure the preset report triggering condition, where the preset report triggering condition includes any one of: a neighbor channel quality being higher than a maximum threshold, the neighbor channel quality being lower than a minimum threshold, a wireless link failing, the number of group call data packets received in a preset time being less than a preset threshold, and a sequence number of received group call data being invalid.

Based on the second aspect and the first implementation of the second aspect, in a second implementation of the second aspect of the present disclosure, the cluster terminal further includes:

a second receiving module, configured to receive a system message including the preset report triggering condition or a group call message including the preset report triggering condition sent by the base station.

Based on the second aspect and the first implementation of the second aspect, in a third implementation of the second aspect of the present disclosure, where the cluster terminal further includes:

a second sending module, configured to send an RRC connection request carrying a measurement result to the base station after it is determined that the measurement result meets a preset report triggering condition, so that the base station returns a response of rejecting connection to the cluster terminal when determining that the preset condition for modifying the air interface resource configuration is not met according to the measurement result.

A system for feeding back downlink channel information is provided in a third aspect of the present disclosure, where the system includes a cluster terminal and a base station;

the base station is configured to send a group call signaling to the cluster terminal;

the cluster terminal is configured to configure a group call context and measure a current downlink channel in a preset period, after the group call signaling is received, and send an RRC connection request carrying a measurement result to the base station after determining that the measurement result meets a preset report triggering condition;

the base station is configured to modify an air interface resource configuration after receiving the RRC connection request carrying the measurement result sent by the cluster terminal and determining that a preset condition for modifying the air interface resource configuration is met according to the measurement result, and send an instruction carrying the modified air interface resource configuration to the cluster terminal; and the cluster terminal is further configured to receive group call data according to the instruction after the instruction is received.

A cluster terminal is provided in a fourth aspect of the present disclosure, where the cluster terminal includes:

a receiver, a transmitter and a processor; where the processor is configured to:

configure a group call context and measures a current downlink channel in a preset period after a group call signaling sent by the base station is received by the receiver;

send an RRC connection request carrying a measurement result to the base station via the transmitter after determining that the measurement result meets a preset report triggering condition, so that the base station modifies an air interface resource configuration when determining that a preset condition for modifying the air interface resource configuration is met according to the measurement result, and sends an instruction carrying the modified air interface resource configuration to the cluster terminal; and receive group call data according to the instruction after the instruction is received by the receiver.

Based on the fourth aspect, in a first implementation of the fourth aspect of the present disclosure, the preset report triggering condition includes any one of: a neighbor channel quality being higher than a maximum threshold, the neighbor channel quality being lower than a minimum threshold, wireless link failing, the number of group call data packets received in a preset time being less than a preset threshold, and a sequence number of received group call data being invalid.

Based on the first implementation of the fourth aspect, in a second implementation of the fourth aspect of the present disclosure, the processor further performs the following step before measuring the current downlink channel:

configuring the preset report triggering condition.

Based on the first implementation of the fourth aspect, in a third implementation of the fourth aspect of the present disclosure, the processor further performs the following step before measuring the current downlink channel:

receiving, via the receiver, a system message including the preset report triggering condition or a group call message including the preset report triggering condition sent by the base station.

Based on the fourth aspect and the first to the third implementations of the fourth aspect, in a fourth implementation of the fourth aspect of the present disclosure, the processor further performs the following step:

sending, via the transmitter, an RRC connection request carrying a measurement result to the base station, after determining that the measurement result meets a preset report triggering condition, so that the base station returns a response of rejecting connection to the cluster terminal when determining that the preset condition for modifying the air interface resource configuration is not met according to the measurement result.

It can be seen from the above technical solutions, in the present disclosure, a cluster terminal in an idle state measures a current downlink channel in a preset period. The cluster terminal sends an RRC connection request carrying a measurement result to the base station after determining that the measurement result meets a preset report triggering condition, so that the base station modifies an air interface resource configuration when determining that a preset condition for modifying the air interface resource configuration is met according to the measurement result and sends an instruction carrying the modified air interface resource configuration to the cluster terminal. The cluster terminal receives group call data according to the received instruction carrying the modified air interface resource configuration. In this way, the feedback of the downlink channel state and the group call data receiving state is achieved, thus effectively improving the accuracy and the flexibility of adjusting the scheduled group call resources by the base station, and enhancing the throughput and the reliability of the system.

DETAILED DESCRIPTION OF EMBODIMENTS

Figure 1:
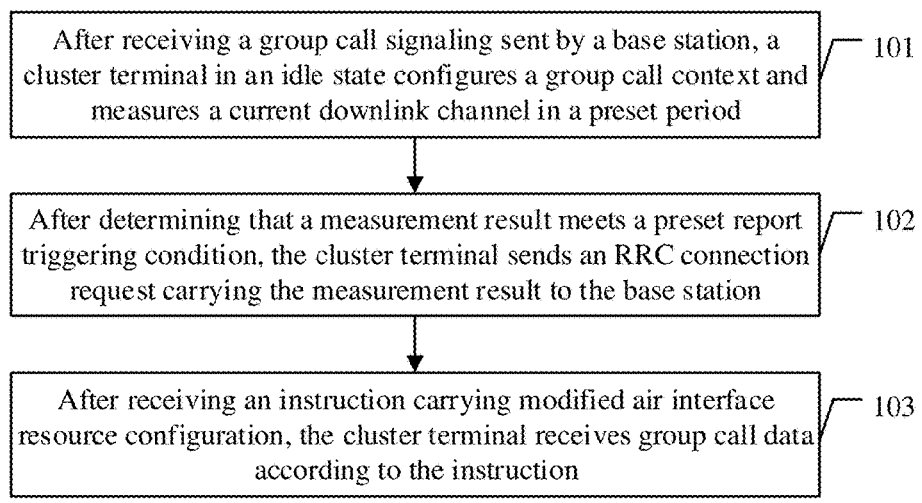
FIG. 1 is a schematic diagram of a method for a cluster terminal to feedback downlink channel information according to an embodiment of the present disclosure.

In order to make those skilled in the art understand the scheme of the present disclosure better, the technical solution in the embodiments of the present disclosure will be described clearly and completely in conjunction with the accompanying drawings in the embodiments of the present disclosure hereinafter. Apparently, the described embodiments are just a part of, rather than all of embodiments of the present disclosure. All other embodiments obtained by those skilled in the art based on the embodiments of the present disclosure without any creative work will fall within the scope of protection of the present disclosure.

A term such as "first" and "second" in the specification, the claims and the above drawings of the present disclosure is used to distinguish similar objects, and is not necessarily used to describe a particular order or sequence between these objects. It should be understood that the data used in this way may be interchanged in due course, so as to implement the embodiments described herein in the order other than what is shown here or described. Furthermore, terms "comprise", "have" or any other variations are intended to cover non-exclusive inclusions, for example, a process, a method, a system, an product or a device including a series of steps or units are not limited to the steps or units listed specifically, and may include the steps or units not listed clear or other inherent steps or units of the process, the method, the product or the device.

A method, a terminal and a system for a cluster terminal to feedback downlink channel information are provided in the embodiment of the present disclosure to solve the problem in the conventional technology, which are mainly applied to a broadband cluster system. A group call is a voice service or video service performed at the same time by all cluster terminals in a group call cluster in the private network cluster communication, and the group call data received by the cluster terminals is voice data or video data.

A radio bear (RB, Radio Bear) in the present disclosure refers to a set of connection formats between a UE and a UTRAN, i.e., configurations of a physical channel, a transmission channel and a logical channel. Each service needs to be configured with a RB, and if there is no service, no RB is required. For transmitting signaling between the CN/URTRN and the UE, only a radio resource control (RRC, Radio Resource Control) protocol connection is needed.

It should be noted that, a cluster system may include at least one group call cluster, and each group call cluster includes multiple cluster terminals. The cluster terminal in the present disclosure refers to a cluster terminal in the group call cluster, and each cluster terminal may be a cluster terminal in an idle state and measure a current downlink channel quality. Therefore, the cluster terminals in each cluster participating in the group call may complete a reporting process.

In the following, a method for a cluster terminal to feedback downlink channel information according to an embodiment of the present disclosure is described in detail with reference to FIG. 1.

A method for a cluster terminal to feedback downlink channel information according to the embodiment is described hereinafter. Referring to FIG. 1, a method for a cluster terminal to feedback downlink channel information according to the embodiment of the present disclosure includes the following steps 101 to 103.

In step 101, after a group call signaling sent by a base station is received, a cluster terminal in an idle state configures a group call context and measures a current downlink channel in a preset period.

A group call air interface resource initial configuration is carried in the configured group call context. The cluster terminal validates the resources involved in the received group call context allocated by the base station, for later processing the group call service data transmitted by the base station through the resources involved in the group call context.

Moreover, the cluster terminal measures the downlink channel quality in the preset period, which is cyclical.

In step 102, after determining that a measurement result meets a preset report triggering condition, the cluster terminal sends a radio resource control, RRC, connection request carrying the measurement result to the base station.

The cluster terminal sends the RRC connection request to the base station, so that the base station modifies an air interface resource configuration when determining that a preset condition for modifying the air interface resource configuration is met according to the measurement result carried in the RRC connection request, and sends an instruction carrying the modified air interface resource configuration to the cluster terminal.

It should be noted that, the cluster terminal may trigger the RRC connection request firstly, and then send the measurement result to the base station, which is not limited herein.

The preset report triggering condition includes any one of a neighbor channel quality being higher than a maximum threshold, the neighbor channel quality being lower than a minimum threshold, a wireless link failing, the number of group call data packets received in a preset time being less than a preset threshold, and a sequence number of received group call data being invalid.

The specific implementation of adjusting the air interface resources by the base station is as follows.

In a case that there is a terminal which meets the above reporting condition and reports the corresponding information to the base station, the base station schedules the resources of the group service in which the terminal participates by degrading the order and increasing power.

In a preset second period, if it is determined that the measurement result does not satisfy the preset report triggering condition, the terminal may send the message that the preset report triggering condition is not met to the base station, so that the base station schedules the resources of the group service in which the terminal participates by upgrading the order and decreasing power, and adjusts the transmission power and the modulation and coding scheme (MCS), and increases or decreases the number of the RBs. Alternatively, the terminal may not make any response.

In step 103, the cluster terminal receives group call data according to the instruction after receiving the instruction carrying the modified air interface resource configuration sent by the base station.

The cluster terminal applies the cluster group call context and the air interface resource configuration which are modified by the base station, so as to receive the new group call service data through the new group air interface resources.

Optionally, on the basis of the embodiment corresponding to FIG. 1, in a first optional embodiment of the method for a cluster terminal to feedback downlink channel information according to the present disclosure, the preset report triggering condition includes any one of a neighbor channel quality being higher than a maximum threshold, the neighbor channel quality being lower than a minimum threshold, a wireless link failing, the number of group call data packets received in a preset time being less than a preset threshold, and a sequence number of received group call data being invalid.

It should be noted that, except for the two conditions of a neighbor channel quality being higher than a maximum threshold and the neighbor channel quality being lower than a minimum threshold which cannot be met at the same time, satisfying any two or more of the conditions may be considered as satisfying the preset report triggering condition. It may be understood that, the other conditions may be in any combination, that is, only one condition may be met, or two or more conditions may be met. Moreover, in addition to the report triggering conditions listed in the optional embodiment, any other similar measurement parameter related to the downlink control channel may further be included, which are not limited herein.

After it is determined that the measurement result meets the preset report triggering condition, the step of sending the RRC connection request carrying the measurement result to the base station by the cluster terminal may include the following steps.

In a case that it is determined that the neighbor channel quality is higher than the maximum threshold, the cluster terminal determines that the measurement result meets the preset report triggering condition, and sends the RRC connection request carrying the measurement result to the base station.

In a case that it is determined that the neighbor channel quality is lower than the minimum threshold, the cluster terminal determines that the measurement result meets the preset report triggering condition, and sends the RRC connection request carrying the measurement result to the base station.

In a case that it is determined that the wireless link fails, the cluster terminal determines that the measurement result meets the preset report triggering condition, and sends the RRC connection request carrying the measurement result to the base station.

In a case that it is determined that the number of group call data packets received in the preset time is less than the preset threshold, the cluster terminal determines that the measurement result meets the preset report triggering condition, and sends the RRC connection request carrying the measurement result to the base station.

In a case that it is determined that a sequence number of received group call data is invalid, the cluster terminal determines that the measurement result meets the preset report triggering condition, and sends the RRC connection request carrying the measurement result to the base station.

Optionally, on the basis of the above embodiment corresponding to FIG. 1 or the first optional embodiment, in a second optional embodiment of the method for a cluster terminal to feedback downlink channel information according to the present disclosure, before measuring the current downlink channel, the cluster terminal configures the preset report triggering condition.

It is understood that the cluster terminal configures related measurement parameters. The group call parameters include network parameters of a RB configuration, a semi-persistent scheduling configuration, a physical resource configuration and an added downlink channel measurement configuration and the like of the cluster group. Also, the cluster terminal sets the measurement period. It may be set as that the cluster terminal reports the parameters to the base station automatically when the preset report triggering condition is met. Alternatively, it may be set as that, after the group call signaling sent by the base station is received, the cluster terminal completes the measurement in the preset period, determines whether the preset report triggering condition is met, and feedbacks a RRC connection request including the measurement result to the base station in a case that the preset report triggering condition is met. There are multiple other specific implementations, and the timing is not limited in the present disclosure.

Optionally, on the basis of the above embodiment corresponding to FIG. 1 or the first optional embodiment, in a third optional embodiment of the method for a cluster terminal to feedback downlink channel information according to the present disclosure, before measuring the current downlink channel, the cluster terminal receives a system message including the preset report triggering condition or a group call message including the preset report triggering condition sent by the base station.

It is understood that the preset report triggering condition is pre-configured on the base station side, and is sent to the cluster terminal by a message when the downlink channel information is required.

Optionally, on the basis of the above embodiment of pre-distortion processing corresponding to FIG. 1 or any optional embodiment, in a fourth optional embodiment of the method for a cluster terminal to feedback downlink channel information according to the present disclosure, the method may further include the following step.

After determining that the measurement result meets the preset report triggering condition, the cluster terminal sends the RRC connection request carrying the measurement result to the base station, so that the base station returns a response of rejecting connection to the cluster terminal when determining that the preset condition for modifying the air interface resource configuration is not met according to the connection request.

In the embodiments of the present disclosure, a cluster terminal in an idle state measures a current downlink channel in a preset period. The cluster terminal sends an RRC connection request carrying a measurement result to the base station after determining that the measurement result meets a preset report triggering condition, so that the base station modifies an air interface resource configuration when determining that a preset condition for modifying the air interface resource configuration is met according to the measurement result, and sends an instruction carrying the modified air interface resource configuration to the cluster terminal. In this way, the feedback of the downlink channel state and the receiving state of the group call data is achieved, thus effectively improving the accuracy and the flexibility of adjusting the scheduled group call resources by the base station and enhancing the throughput and the reliability of the system.

Figure 2:
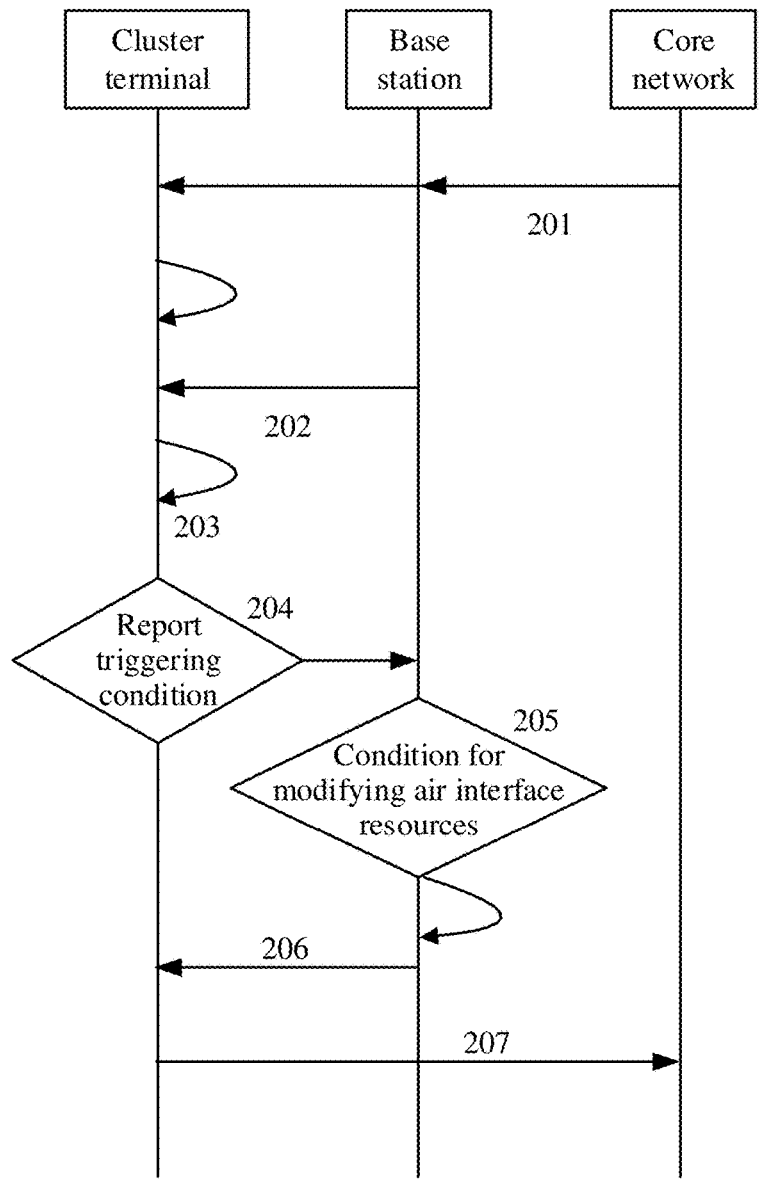
FIG. 2 is a flow chart of a method for a cluster terminal to feedback downlink channel information according to an embodiment of the present disclosure.

For better understanding, a flow for a cluster terminal to feedback the downlink channel information is taken as an example to describe the method for a cluster to feedback the downlink channel information. Referring to FIG. 2, the method for a cluster to feedback the downlink channel information according to another embodiment of the present disclosure includes the following steps 201 to 207.

In step 201, the cluster terminal releases the context and an air interface link.

In step 202, the base station sends a group call signaling and an initial configuration of group call air interface resources to the cluster terminal.

In step 203, the cluster terminal configures the group call context including the measurement configuration and measures the current downlink channel in a preset period.

In step 204, the cluster terminal determines whether the measurement result meets the preset report triggering condition, and sends an RRC connection request carrying the measurement result to the base station in a case that the preset report triggering condition is met.

In step 205, the base station modifies an air interface resource configuration, when determining that the preset condition for modifying the air interface resource configuration is met according to the RRC connection request.

In step 206, an instruction carrying the modified air interface resource configuration is sent to the cluster terminal.

In step 207, the cluster terminal receives group call data according to the instruction.

In the embodiment of the present disclosure, a cluster terminal in an idle state measures a current downlink channel in a preset period. The cluster terminal sends an RRC connection request carrying a measurement result to the base station after determining that the measurement result meets a preset report triggering condition, so that the base station modifies an air interface resource configuration when determining that a preset condition for modifying the air interface resource configuration is met according to the measurement result, and sends an instruction carrying the modified air interface resource configuration to the cluster terminal. In this way, the feedback of the downlink channel state and the receiving state of the group call data is achieved, thus effectively improving the accuracy and the flexibility of adjusting the scheduled group call resources by the base station, and enhancing the throughput and the reliability of the system.

Figure 3:
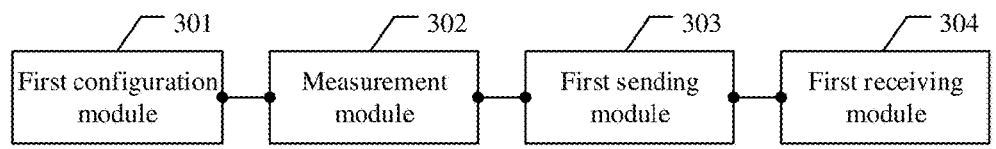
FIG. 3 is a schematic structural diagram of a cluster terminal according to an embodiment of the present disclosure.
Figure 4:
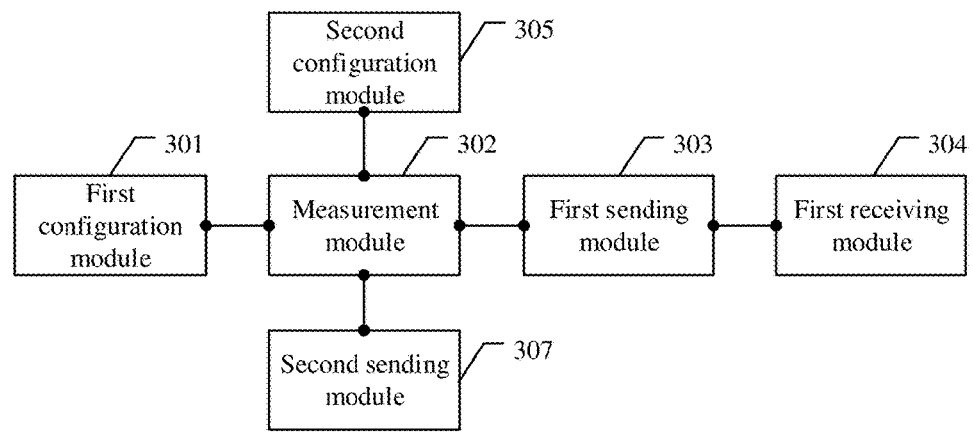
FIG. 4 is another schematic structural diagram of a cluster terminal according to an embodiment of the present disclosure.
Figure 5:
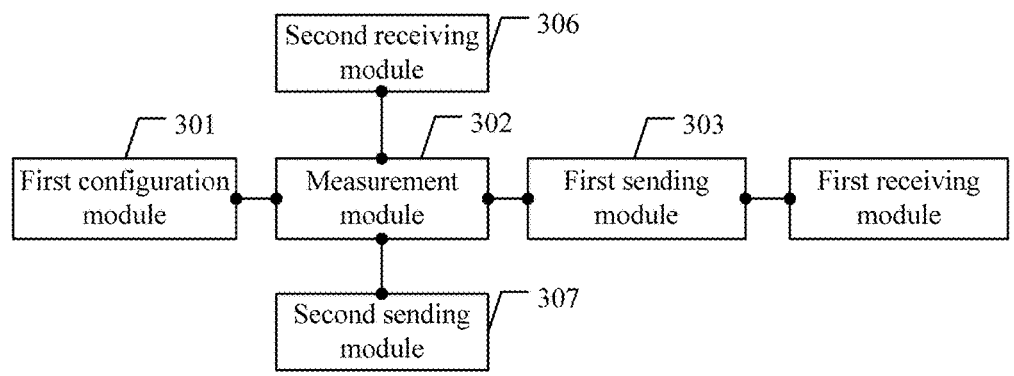
FIG. 5 is another schematic structural diagram of a cluster terminal according to an embodiment of the present disclosure.

The method for a cluster terminal to feedback the downlink channel information according to the embodiment of the present disclosure is described in detail above. A cluster terminal according to the present disclosure is described hereinafter. Referring to FIGS. 3 to 5, a cluster terminal according to an embodiment of the present disclosure includes a first configuration module 301, a measurement module 302, a first sending module 303 and a first receiving module 304.

The first configuration module 301 is configured to configure a group call context after a group call signaling sent by a base station is received.

The measurement module 302 is configured to measure a current downlink channel in a preset period according to the group call context configured by the configuration module.

The first sending module 303 is configured to send an RRC connection request carrying a measurement result to the base station after it is determined that the measurement result meets a preset report triggering condition, so that the base station modifies an air interface resource configuration when determining that a preset condition for modifying the air interface resource configuration is met according to the measurement result, and sends an instruction carrying the modified air interface resource configuration to the cluster terminal.

The first receiving module 304 is configured to receive group call data according to the instruction after receiving the instruction carrying the modified air interface resource configuration.

Optionally, the cluster terminal further includes a second configuration module 305, configured to configure the preset report triggering condition. The preset report triggering condition includes any one of a neighbor channel quality being higher than a maximum threshold, the neighbor channel quality being lower than a minimum threshold, a wireless link failing, the number of group call data packets received in a preset time being less than a preset threshold, and a sequence number of received group call data being invalid.

Optionally, the cluster terminal may further includes a second receiving module 306, configured to receive a system message including the preset report triggering condition or a group call message including the preset report triggering condition sent by the base station.

Optionally, the cluster terminal may further includes a second sending module 307, configured to send an RRC connection request carrying a measurement result to the base station after it is determined that the measurement result meets a preset report triggering condition, so that the base station returns a response of rejecting connection to the cluster terminal when determining that the preset condition for modifying the air interface resource configuration is not met according to the measurement result.

In the embodiment of the present disclosure, the measurement module 302 measures a current downlink channel in a preset period. The first sending module 303 sends an RRC connection request carrying a measurement result to the base station after determining that the measurement result meets a preset report triggering condition, so that the base station modifies an air interface resource configuration when determining that a preset condition for modifying the air interface resource configuration is met according to the measurement result, and sends an instruction carrying the modified air interface resource configuration to the cluster terminal. The first receiving module 304 receives the group call data according to the received instruction carrying the modified air interface resource configuration. In this way, the feedback of the downlink channel state and the receiving state of the group call data is achieved, thus effectively improve the accuracy and the flexibility of adjusting the scheduled group call resources by the base station and enhancing the throughput and the reliability of the system.

Figure 6:
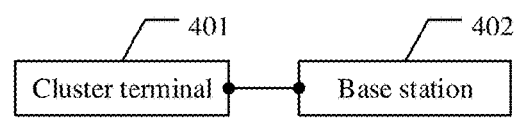
FIG. 6 is a schematic structural diagram of a system for feeding back downlink channel information according to an embodiment of the present disclosure.

The method for a cluster terminal to feedback downlink channel state and the cluster terminal according to the present disclosure are described above. A system for feeding back downlink channel information according to the present disclosure is described in detail hereinafter. Referring to FIG. 6, the system for feeding back the current downlink channel information according to the embodiments of the present disclosure includes a cluster terminal 401 and a base station 402.

The base station 402 is configured to send a group call signaling to the cluster terminal 401.

The cluster terminal 401 is configured to configure a group call context and measure the current downlink channel in a preset period, after the group call signaling is received; and send a RRC connection request carrying the measurement result to the base station 402 after determining that the measurement result meets the preset report triggering condition.

The base station 402 is configured to modify an air interface resource configuration, after receiving the RRC connection request carrying the measurement result sent by the cluster terminal 401 and determining that a preset condition for modifying the air interface resource configuration is met according to the measurement result, and send an instruction carrying the modified air interface resource configuration to the cluster terminal 401.

The cluster terminal 401 is further configured to receive the group call data according to the instruction after the instruction is received.

In the embodiments of the present disclosure, the cluster terminal 401 measures the current downlink channel in the preset period, and sends an RRC connection request carrying a measurement result to the base station 402 after determining that the measurement result meets a preset report triggering condition. The base station 402 modifies an air interface resource configuration when determining that a preset condition for modifying the air interface resource configuration is met according to the measurement result, and sends an instruction carrying the modified air interface resource configuration to the cluster terminal 401. The cluster terminal 401 receives the group call data according to the received instruction carrying the modified air interface resource configuration. In this way, the feedback of the downlink channel state and the receiving state of the group call data is achieved, thus effectively improving the accuracy and the flexibility of adjusting the scheduled group call resources by the base station and enhancing the throughput and the reliability of the system.

A computer storage medium is further provided in the present disclosure. The medium stores programs. When being executed, the program performs all or a part of the steps of the method for a cluster terminal to feedback downlink channel information.

A computer storage medium is further provided in the present disclosure. The medium stores programs. When being executed, the program performs all or a part of the steps of the method for a cluster terminal to feedback downlink channel information, which is performed by the above cluster terminal.

Figure 7:
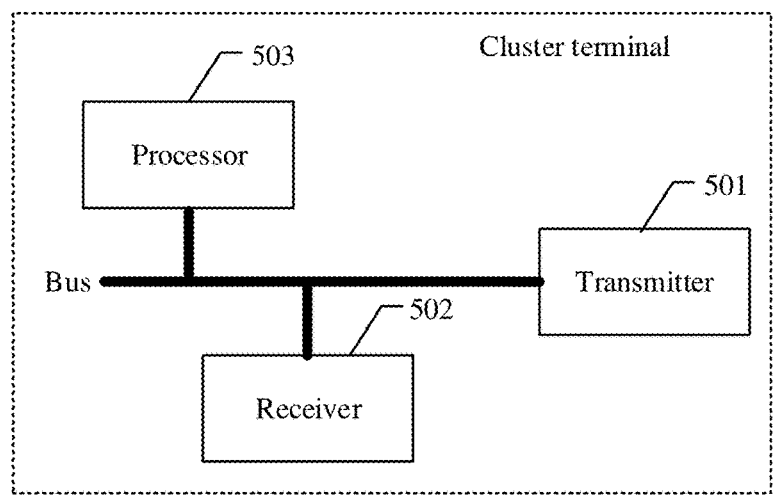
FIG. 7 is a schematic structural diagram of a physical device of a cluster terminal according to an embodiment of the present disclosure.

FIG. 7 is another schematic structural diagram of a user equipment 50 according to an embodiment of the present disclosure. The user equipment 50 may include at least one network interface or other communication interfaces, at least one receiver 501, at least one transmitter 502, at least one processor 503 and a memory 504, which are connected to each other. The communication connection between a system gateway and at least one other network element is realized via the at least one network interface (which may be wired or wireless network interface), which may be implemented through the Internet, a wide area network, a local network, a metropolitan area network, and the like.

The memory 504 may include a read-only memory and a random access memory, and provide the processor 503 with instructions and data. A part of the memory 504 may further include a high-speed random access memory (RAM) or a non-volatile memory.

The memory 504 stores the following elements: executable modules or data structures, or their subsets, or their extended sets of operation instructions and an operation system.

The operation instructions include various operation instructions for realizing various operations.

The operation system includes various system programs for realizing various basic services and processing hardware-based tasks.

In the embodiment of the present disclosure, when the cluster terminal 50 is in an idle state, the processor 503 performs the following operations by invoking the operation instructions (the operation instruction may be stored in the operation system) stored in the memory 504.

The processor 503 configures a group call context after a group call signaling sent by a base station is received by the receiver 501, and measures the current downlink channel in the preset period.

The processor 503 sends a RRC connection request carrying a measurement result to the base station via the transmitter 502 after determining that the measurement result meets a preset report triggering condition, so that the base station modifies an air interface resource configuration when determining that a preset condition for modifying the air interface resource configuration is met according to the measurement result, and sends an instruction carrying the modified air interface resource configuration to the cluster terminal.

The processor 503 receives group call data according to the instruction after the instruction is received by the receiver 501.

Optionally, the preset report triggering condition includes any one of a neighbor channel quality being higher than a maximum threshold, the neighbor channel quality being lower than a minimum threshold, a wireless link failing, the number of group call data packets received in a preset time being less than a preset threshold, and a sequence number of received group call data being invalid.

In some embodiments, the above processor 503 may further configure the preset report triggering condition before measuring the current downlink channel.

In some embodiments, before measuring the current downlink channel, the processor 503 may receive, via the receiver 501, a system message including the preset report triggering condition or a group call message including the preset report triggering condition sent by the base station.

In some embodiments, the processor 503 may further send, via the transmitter 502, the RRC connection request carrying the measurement result to the base station after determining that the measurement result meets the preset report triggering condition, so that the base station returns a response of rejecting connection to the cluster terminal when determining that the preset condition for modifying the air interface resource configuration is not met according to the measurement result.

In the above embodiments, the description of each embodiment has its own focus, and for the content not described in a certain embodiment, one may refer to the related description of other embodiment.

It is apparent to those skilled in the art that, for convenience and simplicity of description, the specific processes of the above-described system, device and unit are not described here, and one may refer to the corresponding processes in the foregoing embodiments of the method for details.

In the embodiments according to the present disclosure, it should be understood that the disclosed system, device and method may be implemented in other ways. For example, the device embodiments described above are only illustrative. For example, the units are divided based on a logic function thereof, and they may be divided in another manner in practice. For example, multiple units or components may be combined or integrated into another system, or some features may be omitted or not be performed. In addition, a displayed or discussed coupling, direct coupling or communication connection may be an indirect coupling or communication connection via some interfaces, devices or units, and may be in an electrical, mechanical or another form.

The units illustrated as separate components may be separated physically or not, and the component displayed as a unit may be a physical module or not. That is, the components may be located at the same place, or may be distributed on multiple network units. A part of or all of the units may be selected to realize the object of the solution of the embodiment according to actual need.

In addition, various functional units in various embodiments of the present disclosure may be integrated into one processing unit, or the various functional units may also be separate physical units, or two or more units may be integrated into one unit. The above integrated units may be implemented in hardware or implemented by a software functional unit.

The integrated unit may also be stored in a computer readable storage medium in a case that the integrated unit is implemented by the software functional unit and sold or used as an independent product. Based on this understanding, the technical solution of the present disclosure that, either essentially or in part contributes to the prior art, or all or part of the technical solution may be embodied in the form of a software product stored in a storage medium, including several instructions for enabling a computer device (which may be a personal computer, a server, a network device or the like) to perform all or part of the steps of the method according to the various embodiments of the present disclosure. The aforementioned storage medium includes various medium capable of storing the program code such as USB disk, a mobile disk, a read-only memory (ROM), a random access memory (RAM), a magnetic disk or an optical disk.

The method, the terminal and the system for a cluster terminal to feedback current downlink channel information according to the present disclosure are introduced in detail above, those skilled in the art may make changes to the specific embodiments and the application scope based on the idea of the embodiment of the present disclosure. In summary, the contents of this specification shall not be understood as limitations to the disclosure.

The invention claimed is:

1. A method for a cluster terminal to feedback downlink channel information, comprising:
configuring, by a cluster terminal in an idle state, a group call context and measuring a current downlink channel in a preset period, after a group call signaling sent by a base station is received;
sending, by the cluster terminal, a radio resource control, RRC, connection request carrying a measurement result to the base station after determining that the measurement result meets a preset report triggering condition, wherein the base station modifies an air interface resource configuration when determining that a preset condition for modifying the air interface resource configuration is met according to the measurement result, and sends an instruction carrying the modified air interface resource configuration to the cluster terminal; and
receiving, by the cluster terminal, group call data according to the instruction after the instruction is received.

2. The method according to claim 1, wherein the preset report triggering condition comprises any one of:
a neighbor channel quality being higher than a maximum threshold,
the neighbor channel quality being lower than a minimum threshold,
a wireless link failing,
the number of group call data packets received in a preset time being less than a preset threshold, and
a sequence number of received group call data being invalid.

3. The method according to claim 1, wherein, before measuring the current downlink channel, the method further comprises:
configuring, by the cluster terminal, the preset report triggering condition.

4. The method according to claim 1, wherein, before measuring the current downlink channel, the method further comprises:
receiving, by the cluster terminal, a system message comprising the preset report triggering condition or a group call message comprising the preset report triggering condition sent by the base station.

5. The method according to claim 1, further comprising:
sending, by the cluster terminal, the RRC connection request carrying the measurement result to the base station after determining that the measurement result meets the preset report triggering condition, wherein the base station returns a response of rejecting connection to the cluster terminal when determining that the preset condition for modifying the air interface resource configuration is not met according to the measurement result.

6. A system for feeding back downlink channel information, comprising:
a cluster terminal, and
a base station, wherein
the base station is configured to send a group call signaling to the cluster terminal;
the cluster terminal is configured to configure a group call context and measure a current downlink channel in a preset period after the group call signaling is received, and send an RRC connection request carrying a measurement result to the base station after determining that the measurement result meets a preset report triggering condition;
the base station is configured to modify an air interface resource configuration after receiving the RRC connection request carrying the measurement result sent by the cluster terminal and determining that a preset condition for modifying the air interface resource configuration is met according to the measurement result, and send an instruction carrying the modified air interface resource configuration to the cluster terminal; and
the cluster terminal is further configured to receive group call data according to the instruction after the instruction is received.

7. A cluster terminal, comprising:
a receiver,
a transmitter, and a processor; wherein the processor is configured to:
configure a group call context and measures a current downlink channel in a preset period after a group call signaling sent by the base station is received by the receiver;
send an RRC connection request carrying a measurement result to the base station via the transmitter after determining that the measurement result meets a preset report triggering condition, wherein the base station modifies an air interface resource configuration when determining that a preset condition for modifying the air interface resource configuration is met according to the measurement result, and sends an instruction carrying the modified air interface resource configuration to the cluster terminal; and
receive group call data according to the instruction after the instruction is received by the receiver.

8. The cluster terminal according to claim 7, wherein the preset report triggering condition comprises any one of:
a neighbor channel quality being higher than a maximum threshold,
the neighbor channel quality being lower than a minimum threshold,
a wireless link failing,
the number of group call data packets received in a preset time being less than a preset threshold, and
a sequence number of received group call data being invalid.

9. The cluster terminal according to claim 8, wherein the processor is further configured to perform the following step before measuring the current downlink channel:
configuring the preset report triggering condition.

10. The cluster terminal according to claim 8, wherein the processor is further configured to perform the following step before measuring the current downlink channel:
receiving, via the receiver, a system message comprising the preset report triggering condition or a group call message comprising the preset report triggering condition sent by the base station.

11. The cluster terminal according to claim 7, wherein the processor is further configured to perform the following step:
sending, via the transmitter, an RRC connection request carrying a measurement result to the base station after determining that the measurement result meets a preset report triggering condition, wherein the base station returns a response of rejecting connection to the cluster terminal when determining that the preset condition for modifying the air interface resource configuration is not met according to the measurement result.

12. The method according to claim 2, wherein, before measuring the current downlink channel, the method further comprises:
configuring, by the cluster terminal, the preset report triggering condition.

13. The method according to claim 2, wherein, before measuring the current downlink channel, the method further comprises:
receiving, by the cluster terminal, a system message comprising the preset report triggering condition or a group call message comprising the preset report triggering condition sent by the base station.

14. The method according to claim 2, further comprising:
sending, by the cluster terminal, the RRC connection request carrying the measurement result to the base station after determining that the measurement result meets the preset report triggering condition, wherein the base station returns a response of rejecting connection to the cluster terminal when determining that the preset condition for modifying the air interface resource configuration is not met according to the measurement result.

15. The method according to claim 3, further comprising:
sending, by the cluster terminal, the RRC connection request carrying the measurement result to the base station after determining that the measurement result meets the preset report triggering condition, wherein the base station returns a response of rejecting connection to the cluster terminal when determining that the preset condition for modifying the air interface resource configuration is not met according to the measurement result.

16. The method according to claim 4, further comprising:
sending, by the cluster terminal, the RRC connection request carrying the measurement result to the base station after determining that the measurement result meets the preset report triggering condition, wherein the base station returns a response of rejecting connection to the cluster terminal when determining that the preset condition for modifying the air interface resource configuration is not met according to the measurement result.

17. The cluster terminal according to claim 8, wherein the processor is further configured to perform the following step:
sending, via the transmitter, an RRC connection request carrying a measurement result to the base station after determining that the measurement result meets a preset report triggering condition, wherein the base station returns a response of rejecting connection to the cluster terminal when determining that the preset condition for modifying the air interface resource configuration is not met according to the measurement result.

18. The cluster terminal according to claim 9, wherein the processor is further configured to perform the following step:
sending, via the transmitter, an RRC connection request carrying a measurement result to the base station after determining that the measurement result meets a preset report triggering condition, wherein the base station returns a response of rejecting connection to the cluster terminal when determining that the preset condition for modifying the air interface resource configuration is not met according to the measurement result.

19. The cluster terminal according to claim 10, wherein the processor is further configured to perform the following step:
sending, via the transmitter, an RRC connection request carrying a measurement result to the base station after determining that the measurement result meets a preset report triggering condition, wherein the base station returns a response of rejecting connection to the cluster terminal when determining that the preset condition for modifying the air interface resource configuration is not met according to the measurement result.

* * * * *